July 12, 1927.
K. E. PEILER
1,635,861
LEER CONVEYER
Filed Aug. 31, 1925
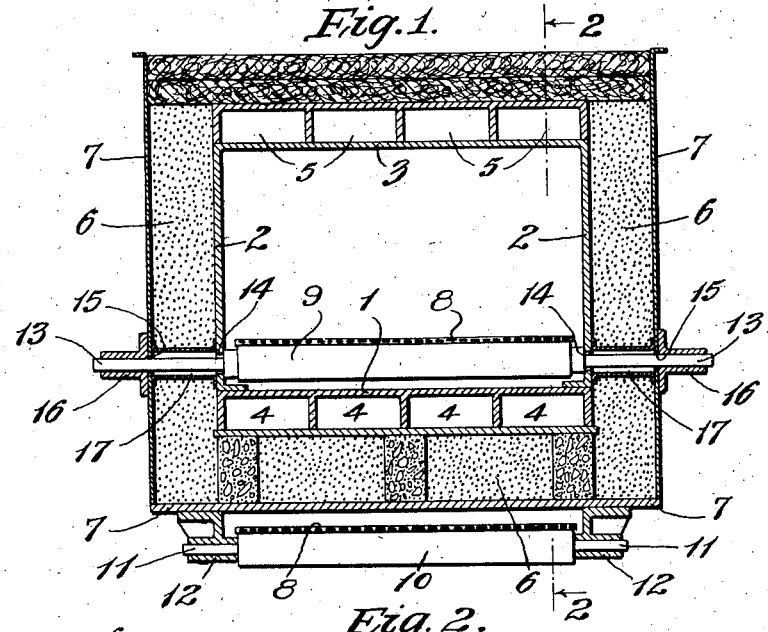
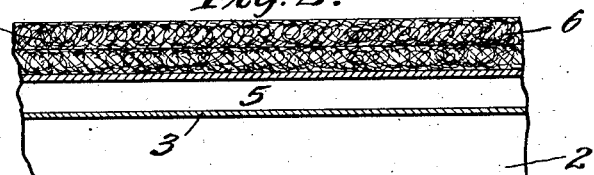
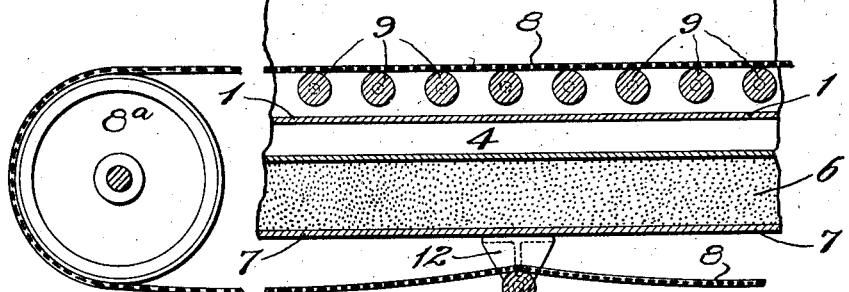
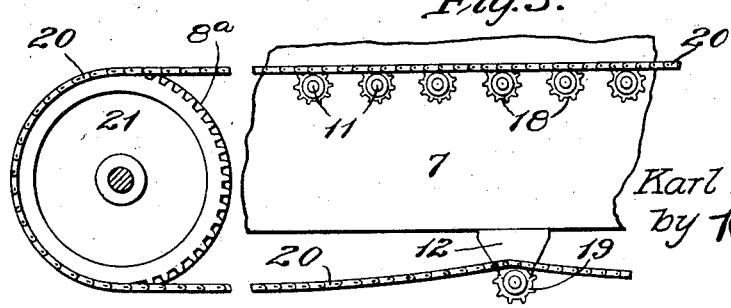
Inventor:
Karl E. Peiler
by Robson D. Brown
Atty.

Patented July 12, 1927.

1,635,861

UNITED STATES PATENT OFFICE.

KARL E. PEILER, OF HARTFORD, CONNECTICUT, ASSIGNOR TO HARTFORD-EMPIRE COMPANY, OF HARTFORD, CONNECTICUT, A CORPORATION OF DELAWARE.

LEER CONVEYER.

Application filed August 31, 1925. Serial No. 53,550.

The invention relates to apparatus for annealing glassware and it has particular relation to conveyers of the endless belt type employed for transporting articles of glassware through a tunnel leer.

In tunnel leers having a heated floor, such as that disclosed in the patent to Vergil Mulholland, No. 1,560,481, issued Nov. 3, 1925, it is particularly desirable to position the ware-bearing strand of the conveyer as close to the floor as possible so as to insure that the conveyer will approximate the temperature of the floor by absorbing the maximum amount of heat radiated therefrom, and so as to prevent a current of air from flowing beneath the ware and disturbing the temperature environment thereof.

In the construction disclosed in the above mentioned Mulholland application, wherein the ware-bearing strand of an endless conveyer belt of woven wire fabric is supported entirely by the metallic floor of the tunnel, these thermal conditions are ideally attained, but in so doing, considerable friction is encountered in drawing the conveyer with its load through the tunnel.

One of the objects of the present invention is to reduce the driving tension on the conveyer by minimizing friction between the conveyer and its support, and at the same time obtain the advantages of mounting the conveyer in proximity to the heated tunnel floor.

Other objects will appear from the following description.

In the accompanying drawings:

Figure 1 is a vertical transverse sectional view through the tunnel of a glass annealing leer equipped with a conveyer supported according to the invention;

Fig. 2 is a vertical longitudinal sectional view taken on line 2—2 of Fig. 1; and Fig. 3 is a fragmentary side elevational view illustrating the means for driving the conveyer supporting rollers independently of the conveyer.

Referring to the drawing, a portion of a leer tunnel is conventionally illustrated as comprising a bottom 1, side walls 2, and a top 3. A plurality of heating flues 4 and cooling flues 5 are provided in the bottom 1 and top 3 respectively, and the dissipation of heat from the tunnel is minimized by a surrounding insulating material 6 contained in a casing 7.

In practicing the invention, an endless conveyer 8, preferably of woven wire fabric, is employed to transport ware through the tunnel and is driven by a suitable drum $8^a$. The ware-bearing strand of the conveyer extends through the tunnel, and is supported therein by a series of rollers 9. The idle strand of the conveyer returns to the entrance end of the tunnel beneath the leer and is supported at intervals by rollers 10, which are mounted on shafts 11 journaled in bearings 12 carried by the bottom of the casing 7.

The rollers 9 are mounted upon shafts 13 which extend loosely through openings 14 and 15 in the side walls 2 and the casing 7 respectively, and are journaled in bearings 16 secured to the casing 7 exteriorly thereof. The insulating material is prevented from obtaining access to the tunnel through the openings 14 or to the bearings 16 through the openings 15 by means of tubes 17 which surround the shafts in spaced relation thereto between the side walls 2 and casing 7. By mounting the bearings 16 exteriorly of the tunnel, they are removed from the heated zone of the tunnel and are to a great extent protected from the effects thereof by the intervening wall of insulation.

The rollers 9 are positioned sufficiently close together and the tension on the belt is sufficiently great to prevent the belt from sagging between the rollers, thereby maintaining a substantially flat ware supporting surface within the tunnel. The rollers 9 occupy substantially the entire vertical distance between floor of the tunnel and the conveyer and obstruct this space sufficiently to prevent a longitudinal current of air from flowing therethrough.

In order to still further reduce driving tension on the belt, sprocket wheels 18 and 19 may be provided on one or both ends of the shafts 13 and 11 respectively, these sprocket wheels are driven by an endless chain 20 which is in turn driven by a sprocket wheel 21 having a pitch diameter equal to that of the conveyer driving drum. By so doing, the rollers 9 and 10 are driven independently of the belt and at a peripheral speed corresponding to the linear speed of the conveyer belt.

By means of this latter construction, friction between the belt and its support is practically eliminated, thereby confining the tension upon the belt to that required to overcome the inertia of the load carried thereby.

In addition to the structural modifications herein shown and described, various other changes in the construction and arrangement of parts may be made without departing from the invention as set forth in the appended claims.

I claim:

1. The combination with a leer embodying a heated tunnel, of an endless conveyer of woven wire fabric for transporting articles of glassware therethrough, a plurality of rollers disposed within said tunnel for supporting the ware-bearing strand of said conveyer, and bearings for said rollers disposed without the heated environment of said tunnel.

2. The combination with a leer embodying a heated tunnel having heat insulated walls, of an endless conveyer for transporting articles of glassware through said tunnel, a plurality of rollers disposed adjacent to the floor of said tunnel for supporting the ware-bearing strand of said conveyer, shafts for supporting said rollers and extending through said insulated walls and bearings for said shafts mounted exteriorly of said walls.

3. Apparatus for annealing glassware comprising a heated tunnel, a casing spaced from the walls thereof and containing a heat insulating material, an endless conveyer for transporting articles of glassware through said tunnel, a plurality of rollers disposed within said tunnel for supporting the ware-bearing strand of said conveyer, shafts for supporting said rollers and extending loosely through the side walls of said tunnel and said casing, bearings for said shafts mounted on said casing and means for preventing the insulating material within said casing from obtaining access to said bearings and said tunnel.

4. Apparatus for annealing glassware comprising a heated tunnel, a casing spaced from the walls thereof and containing a heat insulating material, an endless conveyer for transporting articles of glassware through said tunnel, a plurality of rollers disposed within said tunnel for supporting the ware-bearing strand of said conveyer, shafts for supporting said rollers and extending loosely through the side walls of said tunnel and said casing, bearings for said shafts mounted on said casing and tubular members surrounding said shafts between said side walls and said casing for preventing the insulating material within said casing from obtaining access to said bearings and said tunnel.

5. Apparatus for annealing glassware comprising a tunnel, flues for heating the floor thereof, a conveyer disposed adjacent to said floor for transporting articles of glassware through said tunnel, a plurality of anti-friction devices disposed within said tunnel for supporting the ware-bearing strand of said conveyer, and supports for said devices arranged exteriorly of said tunnel.

6. Apparatus for annealing glassware comprising a tunnel, means for heating said tunnel, a conveyer for transporting articles of glassware through said tunnel, a series of rollers for supporting the ware-bearing strand of said conveyer, means for driving said conveyer, and means for driving said rollers independently of said conveyer.

7. Apparatus for annealing glassware comprising a tunnel, means for heating said tunnel, a conveyer for transporting articles of glassware through said tunnel, a series of rollers for supporting the ware-bearing strand of said conveyer, means for driving said conveyer, and means for driving said rollers independently of said conveyer and at a peripheral speed corresponding to the linear speed of said conveyer.

Signed at Hartford, Conn., this 27th day of August, 1925.

KARL E. PEILER.